United States Patent [19]

Lee

[11] Patent Number: 5,718,407
[45] Date of Patent: Feb. 17, 1998

[54] POWER UNIT MOUNTING SYSTEM

[75] Inventor: Hyosang Lee, Kyungsangnam-do, Rep. of Korea

[73] Assignee: Hyundai Motor Company, Seoul, Rep. of Korea

[21] Appl. No.: 528,333

[22] Filed: Sep. 14, 1995

[51] Int. Cl.⁶ ................................................. F16M 13/00
[52] U.S. Cl. ................ 248/634; 248/635; 248/638; 248/674; 180/312; 267/141.2
[58] Field of Search ....................... 248/200, 300, 248/634, 635, 638, 674; 180/299, 312; 267/141, 141.2, 141.3, 141.4, 141.5, 141.6, 141.7

[56] References Cited

U.S. PATENT DOCUMENTS

| | | | |
|---|---|---|---|
| 3,548,964 | 12/1970 | Krauss et al. | 248/634 X |
| 3,601,348 | 8/1971 | Gonsalves et al. | 248/300 |
| 3,834,344 | 9/1974 | Yoshino | 248/635 X |
| 3,918,667 | 11/1975 | Madden | 248/300 X |
| 4,198,027 | 4/1980 | Urbanek | 248/634 |
| 4,471,935 | 9/1984 | Chiba et al. | 248/638 |
| 4,494,723 | 1/1985 | Kobuki et al. | 248/635 |
| 4,980,589 | 12/1990 | Ochi et al. | 248/674 X |
| 5,035,397 | 7/1991 | Yamada | 248/674 X |
| 5,435,516 | 7/1995 | Ogasawara et al. | 248/635 |

FOREIGN PATENT DOCUMENTS

| | | | |
|---|---|---|---|
| 63-76934 | 4/1988 | Japan . | |
| 1-169136 | 7/1989 | Japan . | |
| 159589 | 7/1957 | Sweden | 248/634 |

*Primary Examiner*—Leslie A. Braun
*Assistant Examiner*—Richard M. Smith
*Attorney, Agent, or Firm*—Finnegan, Henderson, Farabow, Garrett & Dunner, L.L.P.

[57] ABSTRACT

Disclosed is a system for mounting the power unit consisting of the engine and transmission of a vehicle, which comprises an elongated tube-like resilient mount with an elliptic cross section for mounting the power unit on the part of its surface positioned adjacent to the plane formed by connecting the longest diameters of both ends thereof, and a mount support for supporting the resilient mount on the body of the vehicle, wherein the resilient mount is fixedly supported on the mount support by means of a first bolt-nut combination and the support mount on the body also by means of a second bolt-nut combination.

4 Claims, 3 Drawing Sheets

POWER UNIT MOUNTING SYSTEM

BACKGROUND OF THE INVENTION

(1) Field of the Invention

The present invention concerns a system for mounting the power unit consisting of the engine and transmission of a vehicle, which comprises a resilient mount for preventing vibration of the engine from being transferred to the body of a vehicle and a mount support for supporting the resilient mount on a vehicle body.

(2) Description of the Prior Art

Referring to FIG. 4, a conventional power unit mounting system comprises a tube-like resilient mount 101 with a circular cross section for mounting the power unit, and a mount support 108 for supporting the resilient mount on a vehicle body. The resilient mount 101 further comprises a large-diameter pipe 102 and a small-diameter pipe 100, both of which having the common central axis with each other, and a resilient member 104 interposed therebetween. In order that the resilient mount 101 can be readily supported by the mount support 112, there is provided a fixing pipe 110 fixedly attached on the mount support 108 for receiving the resilient mount. The internal small-diameter pipe 100 is to be fixed to a bracket (not shown) on the engine. The resilient member 104 serves to absorb vibration of the engine.

Further, in order to improve the vibration absorbing effect, a pair of empty spaces 114, 116 are respectively defined in the resilient member 104 at vertically opposite sides of the internal small-diameter pipe 100. This results in the restriction of the thickness of the parts 118 and 120 horizontally interposed between the small-diameter pipe 100 and the large-diameter pipe 102, thus causing inferior durability. Moreover, the additional fixing pipe 110 for fixing the resilient mount causes the weight increase, and suffers assembling problems because of requiring a strong pressure to forcibly insert the resilient mount into the fixing pipe.

Referring to other conventional power unit mounting system disclosed in Japanese Laid-Open Patent Publications Nos. 76934/88 and 169136/89, a stopper rubber is provided in the empty spaces of the resilient member, or stopper bolts are arranged through the resilient member so as to check the rotational vibrations of the mount and to make the mount effective even if the resilient member is fractured. However, these cases also require an additional fixing pipe, and therefore, a strong pressure for inserting the mount.

SUMMARY OF THE INVENTION

It is an object of the present invention to provide a power unit mounting system which can increase the durability of the resilient mount.

It is another object of the present invention to provide a power unit mounting system which can mount the resilient mount on the mount support without employing an additional fixing pipe, thereby reducing the weight thereof.

It is still another object of the present invention to provide a power unit mounting system which can simplify the assembling process by using bolt-nut combination.

According to an embodiment of the present invention, a system for mounting the power unit having an engine and a transmission of a vehicle, comprises:

an elongated tube-like resilient mount with an elliptic cross section for mounting the power unit; and a mount support for supporting the resilient mount on a vehicle body, wherein the resilient mount is fixedly supported on the mount support by means of a first bolt-nut combination and the support mount on the body also by means of a second bolt-nut combination.

Preferably, the resilient mount comprises a large-diameter pipe having an elliptic cross section for containing a small-diameter pipe having a circular cross section with the central axis of the large-diameter pipe coinciding with that of the small-diameter pipe, and a resilient member interposed between an outer surface of the small-diameter pipe and an inner surface of the large-diameter pipe. A pair of empty spaces are respectively formed in opposite sides of the small-diameter pipe along a longest diameter of said large-diameter pipe.

It is also preferable that the mount support comprises a channel. The channel has a first flange connected to the body by means of the second bolt-nut combination, a second flange connected to the resilient mount by means of the first bolt-nut combination, and a connecting part for connecting the first and second flanges. The first bolt-nut combination comprises a first bolt vertically inserted from an inside part of the large-diameter pipe through the second flange along the longest diameter, a first nut screwed with the end part of the first bolt protruding from the underside of the second flange, and a second bolt inserted from another inside part of the large-diameter pipe through the second flange at a sharp angle with the first bolt, and a second nut screwed with the end part of the second bolt protruding from the underside of the second flange. The head of the first bolt is preferably embedded in the resilient member, and the head of the second bolt positioned in one of the empty spaces.

The present invention will now be described more specifically with reference to the drawings attached only by way of example.

DETAILED DESCRIPTION OF THE PREFERRED EMBODIMENTS

Figure 1:
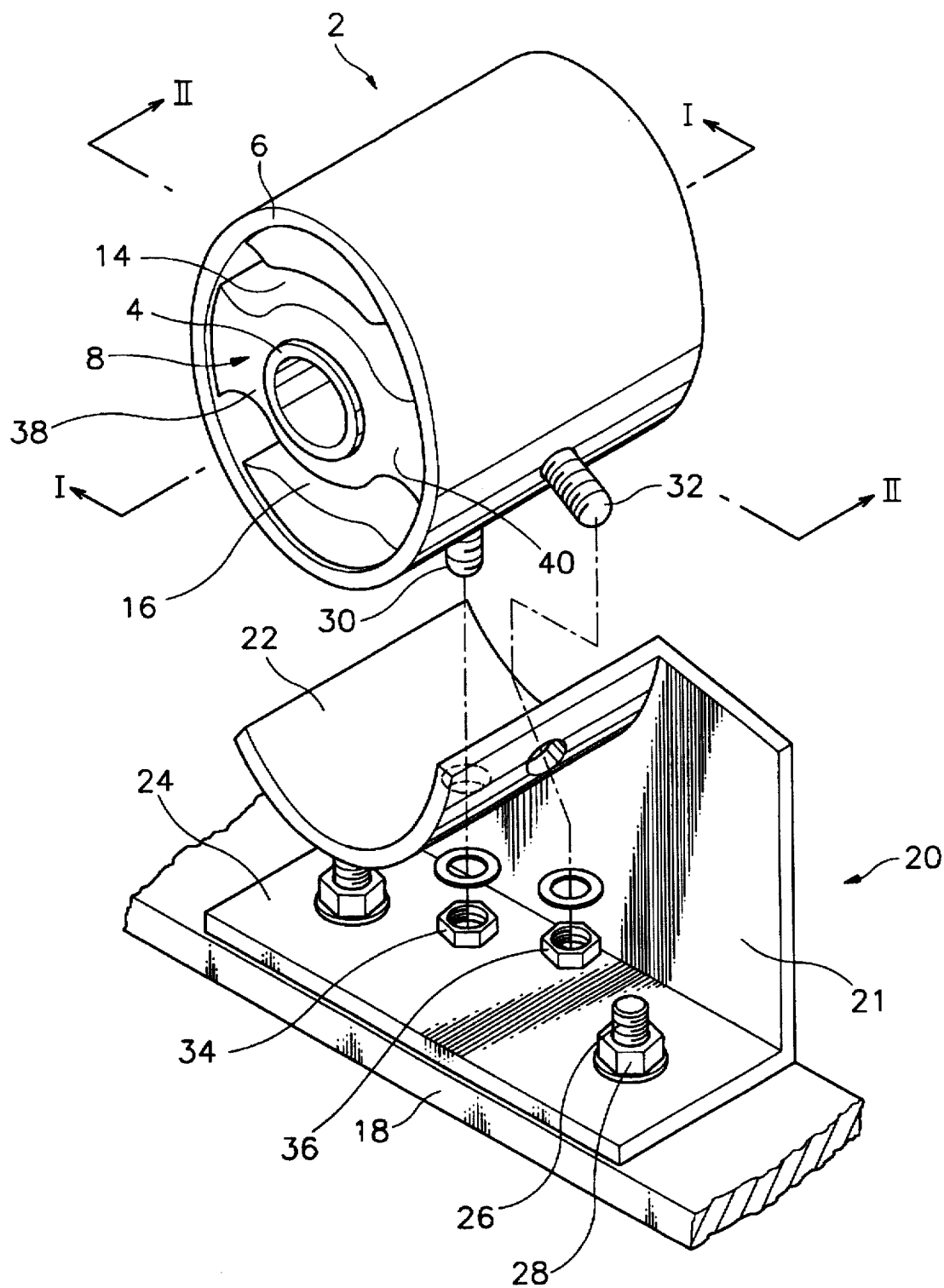
FIG. 1 is an exploded perspective view illustrating a power unit mounting system according a preferred embodiment of the present invention.
Figure 2:
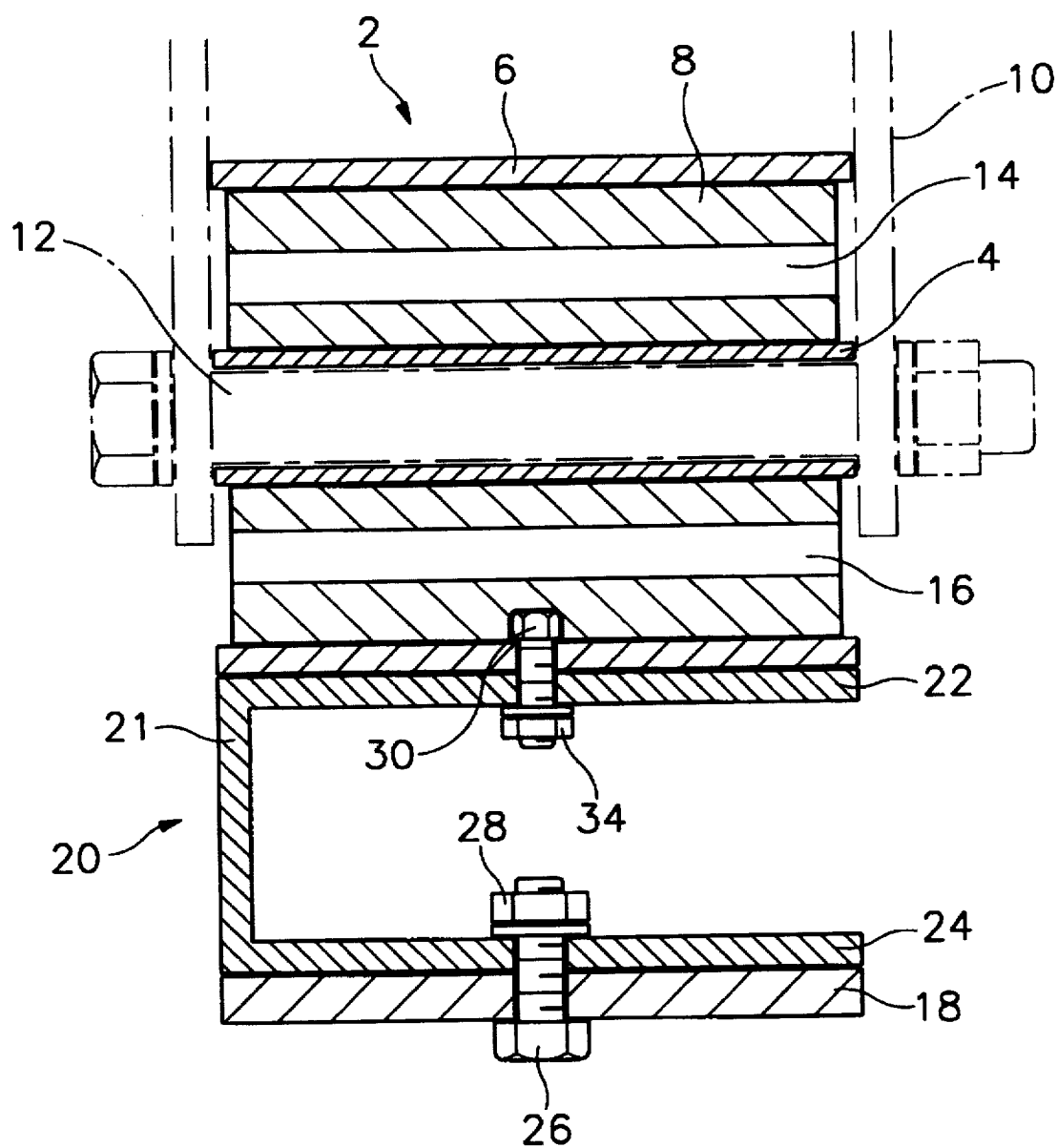
FIG. 2 is a cross sectional view taken along line I—I of the system in FIG. 1 assembled.
Figure 3:
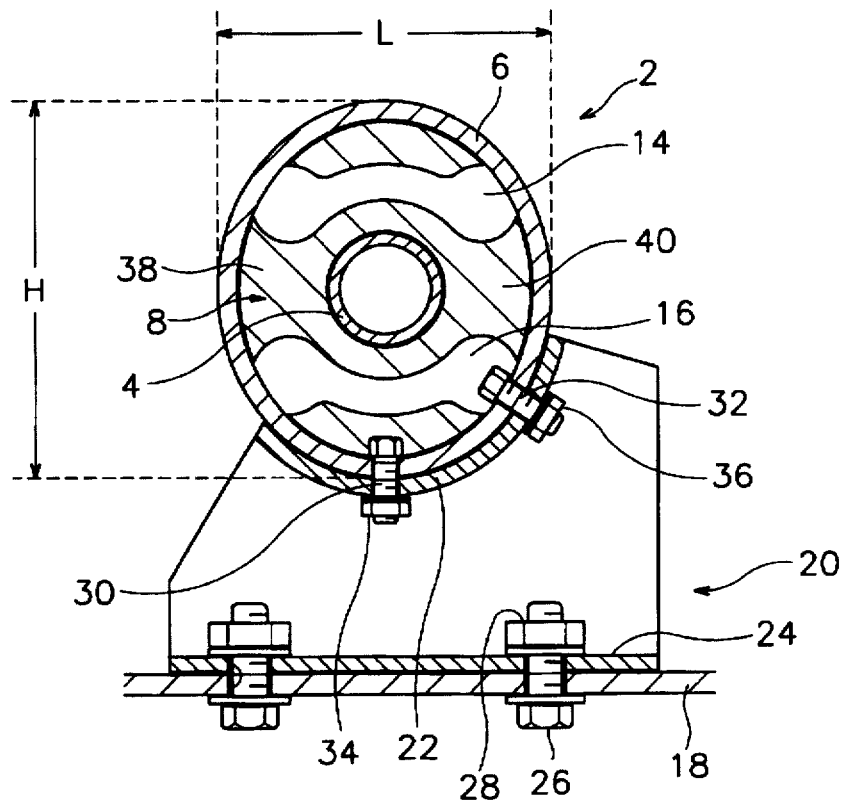
FIG. 3 is a cross sectional view taken along line II—II of the system in FIG. 1 assembled.
Figure 4:
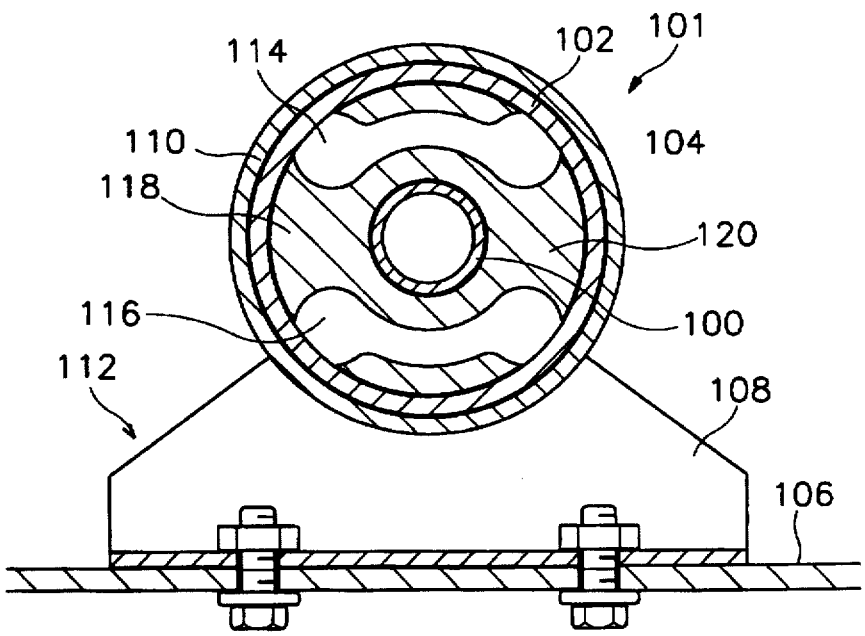
FIG. 4 is a cross sectional view of a conventional power unit mounting system.

FIGS. 1 to 3 show a power unit mounting system according to a preferred embodiment of the present invention, in which the reference numeral 2 represents an elongated tube-like resilient mount 2 having an elliptic cross section.

The resilient mount 2 comprises a large-diameter pipe 6 having an elliptic cross section for containing a small-diameter pipe 4 having a circular cross section. The vertical diameter H of the large-diameter pipe is greater than the horizontal diameter L thereof. The central axis of the large-diameter pipe coincides with that of the small-diameter pipe. The small-diameter pipe 4 is to receive a fixing bolt 12 to hold the bracket 10 fixedly attached to the engine, as shown by imaginary lines in FIG. 2. A resilient member 8 is interposed between the outer surface of the small-diameter pipe 4 and the inner surface of the large-diameter pipe 6. A pair of empty spaces 14 and 16 are respectively formed in opposite sides of the small-diameter pipe 4 along the longest diameter. These empty spaces 14 and 16 are to improve the vibration absorbing effect of the resilient member 8.

The mount support 20 for supporting the resilient mount 2 on a vehicle body 18 includes a first flange 24 connected to the body 18 and a second flange 22 connected to the resilient mount 2. The first and second flanges are connected together by a connecting part 21. The second flange 22 has a surface curvature to fit the bottom surface of the large-diameter pipe 6. The first flange 24 is designed to fit the surface of the vehicle body 18, thus connected to it by means of bolt 26 and nut 28. The connection between the resilient mount 2 and mounting support 20 is made by vertically inserting a first bolt 30 from an inside part of the large-diameter pipe through the second flange along the longest diameter and a second bolt 32 from another inside part of the large-diameter pipe through the second flange at a sharp angle with the first bolt. The bolts 30 and 32 protrude from the underside of the second flange respectively fixed by nuts 34 and 36. As shown in FIGS. 2 and 3, the head of the first bolt 30 is preferably embedded in the resilient member 8, and the head of the second bolt 32 is positioned in one of the empty spaces 16.

As described above, since the cross section of the resilient mount 2 is elliptic, the parts 38 and 40 formed between the empty spaces 14 and 16 of the resilient member 8 are thickened considerably compared to conventional apparatuses to improve the durability of the resilient member 8. In addition, since the distances between the inter and outer pipes 4 and 6 along the longest diameter become relatively large so as to adjust the size of the empty spaces according to the magnitude of the vibration of the power unit. Furthermore, when assembling the resilient mount 2, there are only required the bolts 30 and 32 and nuts 34 and 36 so that the fixing pipe is not employed and thus the process for forcibly inserting the resilient mount 2 is not necessary, thereby reducing the weight as well as considerably improving the assembling process.

What is claimed is:

1. A system mounting a power unit having an engine and a transmission to a body of a vehicle, comprising:
    an elongated tube-like resilient mount with an elliptic cross section of unequal major and minor axes for mounting said power unit; and
    a support mount supporting said resilient mount on the vehicle body, wherein said resilient mount is fixedly supported on said support mount by means of a first bolt-nut combination and said support mount is fixedly supported on said body also by means of a second bolt-nut combination.

2. A system for mounting the power unit as defined in claim 1, wherein said resilient mount comprises a large-diameter pipe having an elliptic cross section for containing a small-diameter pipe having a circular cross section with the central axis of said large-diameter pipe coinciding with that of said small-diameter pipe, and a resilient member interposed between an outer surface of said small-diameter pipe and an inner surface of the large-diameter pipe with a pair of empty spaces being respectively formed on opposite sides of said small-diameter pipe along a longest diameter of said large-diameter pipe.

3. A system for mounting the power unit as defined in claim 1 or 2, wherein said support mount comprises a channel, said channel having a first flange connected to said body by means of said second bolt-nut combination, a second flange connected to said resilient mount by means of said first bolt-nut combination, and a connecting part for connecting said first and second flanges.

4. A system mounting a power unit having an engine and a transmission to a body of a vehicle, comprising:
    an elongated tube-like resilient mount comprising a large-diameter pipe having an elliptical cross section;
    a small-diameter pipe having a circular cross section coaxially disposed in said large-diameter pipe;
    a resilient member interposed between an outer surface of said small-diameter pipe and an inner surface of said large-diameter pipe, said resilient member defining an empty space on each side of said small-diameter pipe along the longest diameter of said elliptical cross section of the large-diameter pipe;
    a support mount fixed to the vehicle body, said support mount comprising a channel having a first flange connected to said body and an integral second flange spaced from the first flange and disposed to receive said resilient mount;
    a first bolt-nut combination comprising a first bolt vertically inserted from inside said large-diameter pipe along said longest diameter and extending through a bore in said second flange, a first nut screwed into the end part of said first bolt protruding through said second flange, a second bolt inserted from inside said large-diameter pipe at a sharp angle with said first bolt and extending through another bore in said second flange, and a second nut screwed into the end part of said second bolt protruding through said second flange, the head of said first bolt being embedded in said resilient member, and the head of said second bolt being positioned in one of said empty spaces; and
    a second bolt-nut combination connecting said first flange to said vehicle body.

* * * * *